(12) United States Patent
Xiang et al.

(10) Patent No.: US 11,887,254 B2
(45) Date of Patent: Jan. 30, 2024

(54) METHODS FOR CORRECTING AND ENCRYPTING SPACE COORDINATES OF THREE-DIMENSIONAL MODEL

(71) Applicant: CHONGQING SURVEY INSTITUTE, Chongqing (CN)

(72) Inventors: Zejun Xiang, Chongqing (CN); Zhiyong Zhou, Chongqing (CN); Yan Zhang, Chongqing (CN); Liangchao Chen, Chongqing (CN); Kaiquan Hu, Chongqing (CN); Hong Ma, Chongqing (CN); Junqian Zhang, Chongqing (CN)

(73) Assignee: CHONGQING SURVEY INSTITUTE, Chongqing (CN)

( * ) Notice: Subject to any disclaimer, the term of this patent is extended or adjusted under 35 U.S.C. 154(b) by 261 days.

(21) Appl. No.: 17/437,685

(22) PCT Filed: Feb. 4, 2021

(86) PCT No.: PCT/CN2021/075261
§ 371 (c)(1),
(2) Date: Sep. 9, 2021

(87) PCT Pub. No.: WO2021/175083
PCT Pub. Date: Sep. 10, 2021

(65) Prior Publication Data
US 2022/0414982 A1 Dec. 29, 2022

(30) Foreign Application Priority Data
Mar. 2, 2020 (CN) .......................... 202010137003.5

(51) Int. Cl.
*G06T 17/05* (2011.01)
*G06F 17/16* (2006.01)
*G06T 19/20* (2011.01)

(52) U.S. Cl.
CPC .............. *G06T 17/05* (2013.01); *G06F 17/16* (2013.01); *G06T 19/20* (2013.01); *G06T 2210/32* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2017/0243398 A1* | 8/2017 | Son | ......................... G06T 17/20 |
| 2019/0026938 A1 | 1/2019 | Fuscoe et al. | |
| 2019/0035149 A1* | 1/2019 | Chen | .................... G06V 40/166 |

FOREIGN PATENT DOCUMENTS

| | | |
|---|---|---|
| CN | 104598746 A | 5/2015 |
| CN | 108694702 A | 10/2018 |

(Continued)

OTHER PUBLICATIONS

Umeyama, "Least-Squares Estimation of Transformation Parameters Between Two Point Patterns", Apr. 1991, IEEE Computer Society, vol. 13, No. 04, pp. 376-380 (Year: 1991).*

(Continued)

*Primary Examiner* — Kent W Chang
*Assistant Examiner* — Jonathan M Cofino
(74) *Attorney, Agent, or Firm* — Cermak Nakajima & McGowan LLP; Malcolm K. McGowan

(57) ABSTRACT

A method for correcting space coordinates of a three-dimensional model includes: step S1, reading information of an original coordinate frame of a three-dimensional model in a first format and the origin of coordinates of the model; reading information of nodes from three-dimensional model data in the first format, and calculating original coordinates of the nodes; step S2, calculating parameters of correction between the original coordinate frame and a target coordinate frame; step S3, transforming and correcting the coordinates of the origin and nodes of the three-dimensional (Continued)

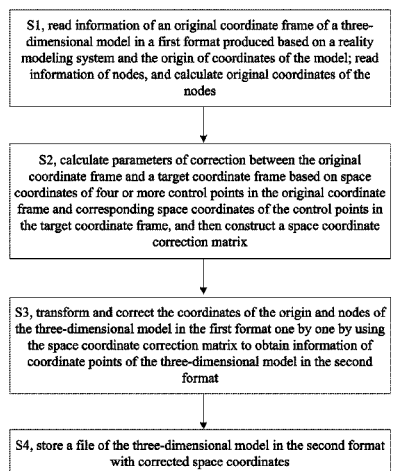

model in the first format one by one by using the space coordinate correction matrix to obtain information of coordinate points of the three-dimensional model in the second format; and step S4, storing a file of the three-dimensional model in the second format with corrected space coordinates. Also, a method for encrypting space coordinates of a three-dimensional model is provided.

19 Claims, 1 Drawing Sheet

(56) References Cited

FOREIGN PATENT DOCUMENTS

| | | |
|---|---|---|
| CN | 109859318 A | 6/2019 |
| CN | 110246203 A | 9/2019 |
| CN | 111415411 A | 7/2020 |

OTHER PUBLICATIONS

McLogan, "What does colinear and coplanar mean", Jun. 16, 2014, 'https://www.youtube.com/@brianmclogan', "https://www.youtube.com/watch?v=BHBPakY8zol" (Year: 2014).*

International Search Report for PCT Patent App. No. PCT/CN2021/075261 (dated May 12, 2021).

* cited by examiner

S1, read information of an original coordinate frame of a three-dimensional model in a first format produced based on a reality modeling system and the origin of coordinates of the model; read information of nodes, and calculate original coordinates of the nodes

S2, calculate parameters of correction between the original coordinate frame and a target coordinate frame based on space coordinates of four or more control points in the original coordinate frame and corresponding space coordinates of the control points in the target coordinate frame, and then construct a space coordinate correction matrix

S3, transform and correct the coordinates of the origin and nodes of the three-dimensional model in the first format one by one by using the space coordinate correction matrix to obtain information of coordinate points of the three-dimensional model in the second format

S4, store a file of the three-dimensional model in the second format with corrected space coordinates

METHODS FOR CORRECTING AND ENCRYPTING SPACE COORDINATES OF THREE-DIMENSIONAL MODEL

CROSS REFERENCE TO RELATED APPLICATION

This patent application claims the benefit and priority of Chinese Patent Application No. 202010137003.5 filed with the China National Intellectual Property Administration (CNIPA) on Mar. 2, 2020 and entitled "METHODS FOR CORRECTING AND ENCRYPTING SPACE COORDINATES OF THREE-DIMENSIONAL MODEL", which is incorporated by reference herein in its entirety as part of the present application.

TECHNICAL FIELD

The present disclosure relates to the field of construction information analysis, and in particular, to methods for correcting and encrypting space coordinates of a three-dimensional model.

BACKGROUND ART

As the oblique photography technology is getting increasingly mature, there has been an explosive growth of three-dimensional city model data in recent years. There is an urgent need to improve the geometric accuracy of three-dimensional model data so as to further expand the applications of three-dimensional model data and finally realize integrated management of three-dimensional city model data. However, a three-dimensional model may have inconsistent geometric accuracy or different coordinate frames due to differences in production time, production mode, production condition and geographic position of three-dimensional model data, rendering integrated management of the model difficult. For example, different coordinate frames of a three-dimensional model would be required when used in different projects. To meet the requirements of different projects, a same set of data needs to be produced repeatedly so as to output models in different space coordinate frames, thus leading to repetitive work and requiring much time and effort. Currently, during the establishment of three-dimensional models in different space coordinate frames, reproduction of data of coordinate points and remodeling are usually required, thus leading to repetitive work and requiring much time and effort.

SUMMARY

In view of the above problems, an objective of the present disclosure is to provide methods for correcting and encrypting space coordinates of a three-dimensional model so as to reduce production costs and improve the production efficiency.

To achieve the above objective, the present disclosure provides the following technical solutions:

A method for correcting space coordinates of a three-dimensional model includes:

step S1, reading information of an original coordinate frame of a three-dimensional model in a first format produced based on a reality modeling system and the origin of coordinates of the model; reading information of nodes from three-dimensional model data in the first format, and calculating original coordinates of the nodes;

step S2, calculating parameters of correction between the original coordinate frame and a target coordinate frame based on space coordinates of four or more control points in the original coordinate frame in the first format and corresponding space coordinates of the four or more control points in the target coordinate frame in a second format, and constructing a space coordinate correction matrix, where the control points are noncoplanar arbitrary points in regions of the three-dimensional model;

step S3, transforming and correcting the coordinates of the origin and nodes of the three-dimensional model in the first format one by one by using the space coordinate correction matrix to obtain information of coordinate points of the three-dimensional model in the second format; and step S4, storing a file of the three-dimensional model in the second format with corrected space coordinates.

Preferably, step S2 may further include the following steps to calculate the parameters of correction between the original coordinate frame in the first format and the target coordinate frame and construct the space coordinate correction matrix:

step S21, obtaining the space coordinates of the four or more control points in the regions of the three-dimensional model in the original coordinate frame in the first format and the space coordinates of the control points in the target coordinate frame in the second format, and establishing a mathematical model for correction between the original coordinate frame and the target coordinate frame;

step S22, inputting the obtained space coordinates of the control points in the original coordinate frame and in the target coordinate frame into the mathematical model for correction to calculate the parameters of correction; and step S23, constructing the space coordinate correction matrix with the parameters of correction calculated in step S22.

Preferably, the mathematical model for correction established in step S21 is shown below: the mathematical model for correction between the original coordinate frame and the target coordinate frame is established in the form of a seven-parameter model shown in formula (1); a general form of the mathematical model for correction is as shown in formula (2); seven parameters are introduced into the model, including three translation parameters $X_0$, $Y_0$ and $Z_0$ that denote coordinate differences between the origins of coordinates of two space coordinate frames, three rotation parameters $\varepsilon_x$, $\varepsilon_y$ and $\varepsilon_z$ that are used for orderly rotating three coordinate axes such that X-, Y- and Z-axes of two space rectangular coordinate frames coincide, and one scale parameter m that denotes a ratio of lengths of a same straight line segment in two space coordinate frames to allow scale transformation.

$$\begin{bmatrix} X_2 \\ Y_2 \\ Z_2 \end{bmatrix} = (1+m) \begin{bmatrix} X_1 \\ Y_1 \\ Z_1 \end{bmatrix} + \begin{bmatrix} 0 & \varepsilon_Z & -\varepsilon_Y \\ -\varepsilon_Z & 0 & \varepsilon_Z \\ \varepsilon_Y & -\varepsilon_X & 0 \end{bmatrix} \begin{bmatrix} X_1 \\ Y_1 \\ Z_1 \end{bmatrix} + \begin{bmatrix} X_0 \\ Y_0 \\ Z_0 \end{bmatrix} \qquad (1)$$

where $X_1$, $Y_1$ and $Z_1$ denote the space coordinates in the original coordinate frame in the first format, and $X_2$, $Y_2$ and $Z_2$ denote the space coordinates in the target coordinate frame in the second format; and the general form is as follows:

$$\left.\begin{array}{l}X_2 = X_0 + (1+m)X_1 + \varepsilon_Z Y_1 - \varepsilon_Y Z_1 \\ Y_2 = Y_0 + (1+m)Y_1 - \varepsilon_Z X_1 + \varepsilon_X Z_1 \\ Z_2 = Z_0 + (1+m)Z_1 + \varepsilon_Y X_1 - \varepsilon_X Y_1\end{array}\right\} \quad (2)$$

Preferably, orthographic projection or back projection may be performed based on corresponding reference frames for the coordinate frame in the first format and the coordinate frame in the second format before and after transformation, respectively.

Preferably, in step S22, the parameters of correction may be calculated by using a least square method.

Preferably, in step S1, the three-dimensional model in the first format may be a three-dimensional model in OpenSceneGraph Binary Scene Data (OSGB) format produced based on ContextCapture reality modeling system; and step S1 may specifically include: reading the information of the original coordinate frame of the three-dimensional model in OSGB format and the origin of coordinates of the model; reading information of nodes from three-dimensional model data in the first format, and calculating original coordinates of the nodes; reading data of tiles of the three-dimensional model in OSGB format one by one, obtaining information of PagedLOD nodes in the tiles, and calculating original coordinates of the PagedLOD nodes.

Preferably, in step S1, the original coordinates of each of the PagedLOD nodes in the tiles of the three-dimensional model in OSGB format may be calculated according to the following formula:

original coordinates of a PagedLOD
  node=coordinates of the origin of the model+
  coordinates of a geometric coordinate point.

Preferably, in step S3, the coordinates of the origin of the three-dimensional model and the PagedLOD nodes of the tiles may be transformed and corrected one by one by using the space coordinate correction matrix.

Preferably, step S3 may specifically include the following steps:

step S31, performing space coordinate correction on PagedLOD original coordinates based on the space coordinate correction matrix to obtain corrected PagedLOD space coordinates and corrected space coordinates of the origin of the three-dimensional model; and step S32, after the PagedLOD space coordinate correction is completed, calculating the coordinates of a geometric coordinate point with the corrected PagedLOD space coordinates and the corrected space coordinates of the origin of the three-dimensional model obtained in step S31 according to the following formula:

coordinates of a geometric coordinate
  point=corrected PagedLOD space coordinates−
  corrected space coordinates of the origin of the
  three-dimensional model.

Further provided is a method for encrypting space coordinates of a three-dimensional model, where original space coordinates are encrypted by coordinate transformation using the method for correcting space coordinates of a three-dimensional model as described above.

Compared with the prior art, the present disclosure has the following advantages:

The proposed method can realize arbitrarily transformation or correction of the space coordinate frame of a three-dimensional model, allowing for direct correction of the results of a three-dimensional model into the results of the three-dimensional model in another different space coordinate frame. Unlike the traditional space coordinate frame transformation process in which original data needs to be collected again to produce a three-dimensional model in a target format, a mode of original data→data processing→three-dimensional model results is achieved herein. Thus, the production cost is saved and the production efficiency is improved. Moreover, a same set of data can be used in multiple space coordinate frames, and therefore, the utility value of the data is increased.

The proposed method can realize arbitrarily transformation or correction of the space coordinate frame of a three-dimensional model, thereby effectively solving the problems of inconsistent geometric accuracy and different coordinate frames of three-dimensional models due to differences in production time, production mode, production condition and geographic position. Thus, efficient integrated management and use of three-dimensional models in different coordinate frames with different geometric accuracy can be realized.

The proposed method can realize space coordinate correction on a three-dimensional model by using existing control points. Thus, the problem of poor geometric accuracy resulting from no control point or sparse control points during the production of the three-dimensional model can be effectively solved. The space geometric accuracy of the three-dimensional model can be improved and applications thereof can be extended. Moreover, the production cost of a high-accuracy three-dimensional mode can be reduced.

The proposed method can realize arbitrarily transformation or correction of the space coordinates of a three-dimensional model and can be used to perform coordinate correction on a secret-involved three-dimensional model. Thus, encryption of the space coordinates of a three-dimensional model can be realized while the relative geometric accuracy of a three-dimensional reality model is guaranteed, thereby facilitating the release and browsing of the three-dimensional model on Internet and being conducive to extension of three-dimensional model applications.

BRIEF DESCRIPTION OF THE DRAWINGS

To describe the technical solutions in embodiments of the present disclosure or in the prior art more clearly, the accompanying drawings needed in the embodiments will be introduced below briefly. Apparently, the accompanying drawings in the following description show merely some embodiments of the present disclosure, and other drawings can be derived from these accompanying drawings by those of ordinary skill in the art without creative efforts.

FIG. 1 is a flowchart of a method for correcting space coordinates of a three-dimensional model in exemplary example 1 of the present disclosure.

DETAILED DESCRIPTION OF THE EMBODIMENTS

The embodiments of the present disclosure will be described below in detail. Examples of the embodiments are shown in the accompanying drawings. The same or similar reference numerals represent the same or similar elements or elements having the same or similar function throughout the description. The examples described below with reference to the accompanying drawings are exemplary, and are only used to explain the present disclosure but should not be construed as a limitation to the present disclosure.

It should be understood that in the description of the present disclosure, orientations or positional relationships indicated by terms such as "longitudinal", "transverse", "upper", "lower", "front", "rear", "left", "right", "vertical", "horizontal", "top", "bottom", "inside" and "outside" are all based on what are illustrated in the drawings, and such terms are used herein for ease and simplification of description of the present disclosure rather than indicating or implying that the stated device or element must have a specific orientation or must be constructed and operated in a specific orientation, and thus cannot be construed as limitations to the present disclosure.

In the description of the present disclosure, it should be noted that, unless otherwise clearly specified and defined, meanings of terms "install", "interconnect", and "connect" should be understood in a board sense. For example, the connection may be a mechanical connection or an electrical connection, intercommunication between two components, a direct connection, or an indirect connection by using an intermediate medium. A person of ordinary skill in the art will understand specific meanings of such terms based on a specific situation.

Example 1

As shown in FIG. 1, this example provides a method for correcting space coordinates of a three-dimensional model, including the following steps:

step S1, read information of an original coordinate frame of a three-dimensional model in a first format produced based on a reality modeling system and the origin of coordinates of the three-dimensional model in the first format; read information of nodes from three-dimensional model data in the first format, and calculate original coordinates of the nodes;

step S2, calculate parameters of correction between the original coordinate frame and a target coordinate frame based on space coordinates of four or more control points in the original coordinate frame in the first format and corresponding space coordinates of the four or more control points in the target coordinate frame in a second format, and construct a space coordinate correction matrix, where the control points are noncoplanar arbitrary points in regions of the three-dimensional model;

step S3, transform and correct the coordinates of the origin and nodes of the three-dimensional model in the first format one by one by using the space coordinate correction matrix to obtain information of coordinate points of the three-dimensional model in the second format; and step S4, store a file of the three-dimensional model in the second format with corrected space coordinates.

Step S2 further includes the following steps to calculate the parameters of correction between the original coordinate frame in the first format and the target coordinate frame and construct the space coordinate correction matrix:

step S21, obtain the space coordinates of the four or more control points in the regions of the three-dimensional model in the original coordinate frame in the first format and the space coordinates of the control points in the target coordinate frame in the second format, and establish a mathematical model for correction between the original coordinate frame and the target coordinate frame;

step S22, input the obtained space coordinates of the control points in the original coordinate frame and in the target coordinate frame into the mathematical model for correction to calculate the parameters of correction; and step S23, construct the space coordinate correction matrix with the parameters of correction calculated in step S22. The parameters of correction include translation parameters ($X_0$, $Y_0$ and $Z_0$), rotation parameters ($\varepsilon_x$, $\varepsilon_y$ and $\varepsilon_z$) and scale parameter m. The space coordinate correction matrix contains the above-mentioned seven parameters of correction.

In a preferred embodiment of the present disclosure, in step S21, the four or more control points in the regions of the three-dimensional model can be collected from existing control point data or measured from the three-dimensional model. Higher space coordinate correction accuracy can be achieved with more control points that are distributed more uniformly.

The mathematical model for correction established in step S21 is shown below:

The original coordinate frame in the first format and the target coordinate frame in the second format have the problems of inconsistent origins, unparallel coordinate axes and/or inconsistent scales. The mathematical model for correction between the original coordinate frame and the target coordinate frame is typically established in the form of a seven-parameter model shown in formula (1); and a general form of the mathematical model for correction is as shown in formula (2). Seven parameters are introduced into the mathematical model for correction, including: three translation parameters $X_0$, $Y_0$ and $Z_0$, $X_0$, $Y_0$ and $Z_0$ denoting coordinate differences between the origins of coordinates of two space coordinate frames, $X_0$ denoting a difference between X-axes of two space coordinate frames, $Y_0$ denoting a difference between Y-axes of two space coordinate frames and $Z_0$ denoting a difference between Z-axes of two space coordinate frames; three rotation parameters $\varepsilon_x$, $\varepsilon_y$ and $\varepsilon_z$ that are used for orderly rotating three coordinate axes such that X-, Y- and Z-axes of two space rectangular coordinate frames coincide; and one scale parameter m that denotes a ratio of lengths of a same straight line segment in two space coordinate frames to allow scale transformation.

$$\begin{bmatrix} X_2 \\ Y_2 \\ Z_2 \end{bmatrix} = (1+m) \begin{bmatrix} X_1 \\ Y_1 \\ Z_1 \end{bmatrix} + \begin{bmatrix} 0 & \varepsilon_Z & -\varepsilon_Y \\ -\varepsilon_Z & 0 & \varepsilon_X \\ \varepsilon_Y & -\varepsilon_X & 0 \end{bmatrix} \begin{bmatrix} X_1 \\ Y_1 \\ Z_1 \end{bmatrix} + \begin{bmatrix} X_0 \\ Y_0 \\ Z_0 \end{bmatrix} \quad (1)$$

where $X_1$, $Y_1$ and $Z_1$ denote the space coordinates in the original coordinate frame in the first format, and $X_2$, $Y_2$ and $Z_2$ denote the space coordinates in the target coordinate frame in the second format; and the general form is as follows:

$$\left. \begin{aligned} X_2 &= X_0 + (1+m)X_1 + \varepsilon_Z Y_1 - \varepsilon_Y Z_1 \\ Y_2 &= Y_0 + (1+m)Y_1 - \varepsilon_Z X_1 + \varepsilon_X Z_1 \\ Z_2 &= Z_0 + (1+m)Z_1 + \varepsilon_Y X_1 - \varepsilon_X Y_1 \end{aligned} \right\} \quad (2)$$

Preferably, orthographic projection and back projection are performed based on corresponding reference frames for the coordinate frame in the first format and the coordinate frame in the second format before and after transformation, respectively. If the original coordinate frame in the first format in step S1 is a geographic coordinate frame, namely a coordinate frame in latitude and longitude format, orthographic projection is performed on original coordinates in the first format to obtain a projected coordinate frame in the first format before transformation (i.e., before step S2). Coordinate correction is then performed on projected coordinates in the first format by using the coordinate correction matrix according to step S2 and step S3 to obtain a projected coordinate frame in the second format. If the target coordinate frame in the second format is the geographic coordinate frame, back projection is performed after the coordinate correction (after step S2 and step S3) to obtain the geographic coordinate frame in the second format, namely a coordinate frame in latitude and longitude format, based on the projected coordinates in the second format.

In step S22, the parameters of correction are calculated by using a least square method with four or more pairs of known points. Each of the four or more pairs of known points includes a coordinate point in the original coordinate frame $(X_1, Y_1, Z_1)$ and a coordinate point in the target coordinate frame $(X_2, Y_2, Z_2)$. The results of the calculation are determined translation parameters $(X_0, Y_0$ and $Z_0)$, rotation parameters $(\varepsilon_x, \varepsilon_y$ and $\varepsilon_z)$ and scale parameter m. The least square method optimizes the function matching of data by minimizing the sum of square errors. Unknown data can be obtained easily by using a least square method, and the sum of square errors between the obtained data and real data is minimized. In this example, the parameters of correction are calculated by using a least square method.

Example 2

In this example, the method for correcting space coordinates of a three-dimensional model of Example 1 is described in detail by taking a three-dimensional model in OSGB format (i.e., the first format) produced based on ContextCapture reality modeling system for example. ContextCapture reality modeling system is currently mainstream three-dimensional reality model production software that is characterized by simple operation, no need for human intervention, good modeling effect, etc. OSGB format is binary version of OpenSceneGraph Scene Data (OSG) format, which is a general three-dimensional model format. In this embodiment, the space coordinate correction of the three-dimensional model in OSGB format mainly includes space coordinate correction of tiles and space coordinate correction of the origin of the model. The specific steps are as follows:

step S1, read the information of the original coordinate frame of the three-dimensional model in OSGB format produced based on ContextCapture reality modeling system and the origin of coordinates of the model; read data of tiles of the three-dimensional model in OSGB format one by one, obtain information of PagedLOD nodes in the tiles, and calculate original coordinates of the PagedLOD nodes;

step S2, calculate the parameters of correction between the original coordinate frame and the target coordinate frame, and construct the space coordinate correction matrix;

step S3, transform and correct the coordinates of the origin of the three-dimensional model and the PagedLOD nodes of the tiles one by one by using the space coordinate correction matrix; and step S4, store a file of OSGB tiles with corrected space coordinates, and modify a metadata file of the model in OSGB format.

In this embodiment, preferably, the three-dimensional model in OSGB format is produced by ContextCapture reality modeling system.

In this embodiment, the three-dimensional model in OSGB format produced based on ContextCapture reality modeling system is stored in the form of tiles and mainly composed of data of model tiles and a metadata file. The three-dimensional model is divided into a number of tiles, each tile containing data of several levels of detail (LODs), i.e., node data. PagedLOD nodes in the tiles of the three-dimensional model in OSGB format mainly store the information of geometric coordinate points of the tiles of the three-dimensional model.

In a preferred embodiment of the present disclosure, in step S1, the original coordinates of each of the PagedLOD nodes in the tiles of the three-dimensional model in OSGB format are obtained from the coordinates of the origin of the model plus the coordinates of a PagedLOD geometric coordinate point. Specifically, the original coordinates of each of the PagedLOD nodes in the tiles of the three-dimensional model in OSGB format are calculated according to the following formula:

original coordinates of a PagedLOD node=coordinates of the origin of the three-dimensional model in OSGB format+coordinates of a geometric coordinate point.

Step S3 further includes the following steps to transform and correct the coordinates of the PagedLOD nodes in the tiles of the three-dimensional model one by one:

step S31, perform space coordinate correction on PagedLOD original coordinates based on the space coordinate correction matrix to obtain corrected PagedLOD space coordinates and corrected space coordinates of the origin of the three-dimensional model; and step S32, after the PagedLOD space coordinate correction is completed, calculate the coordinates of a geometric coordinate point with the corrected PagedLOD space coordinates and the corrected space coordinates of the origin of the three-dimensional model obtained in step S31 according to the following formula:

coordinates of a geometric coordinate point=corrected PagedLOD space coordinates−corrected space coordinates of the origin of the three-dimensional model.

The original coordinate frame of the three-dimensional model in OSGB format produced based on ContextCapture reality modeling system and the coordinates of the origin of the model are saved in the metadata file having a name of metadata.xml. Therefore, in step S4, the metadata file of the model in OSGB format is modified after the file of OSGB tiles with corrected space coordinates is obtained. The method for correcting space coordinates of a three-dimensional model described in this example would not cause changes in format and pyramid structure of the three-dimensional model in the first format during space coordinate correction.

Example 3

This example provides a method for encrypting space coordinates of a three-dimensional model, where original space coordinates are encrypted by coordinate transformation using the method for correcting space coordinates of a three-dimensional model as described in Example 1 or Example 2.

A three-dimensional reality model is a novel mapping product with real space coordinates, i.e., secret-involved data, and thus needs to be processed before release to the Internet. In this example, encryption of the space coordinates of a three-dimensional model can be realized by performing coordinate correction on secret-involved three-dimensional model, thereby facilitating the release and browsing of the three-dimensional reality model on Internet and being conducive to extension of three-dimensional reality model applications.

In the specification, the description of "one embodiment", "some embodiments", "an example", "a specific example" and "some examples" means that a specific feature, structure, material or characteristic described in combination with the embodiment(s) or example(s) are included in at least one embodiment or example of the present disclosure. In this specification, the schematic representation of the above terms does not necessarily refer to the same embodiment or example. Moreover, the specific features, structures, materials or characteristics described may be combined in any suitable manner in any one or more embodiments or examples. Various replacements, variations and improvements made without departing from the principle and scope of the present disclosure by a person skilled in the art shall fall within the protection scope of the present disclosure.

What is claimed is:

1. A method for correcting space coordinates of a three-dimensional model, comprising:

step S1, reading information of an original coordinate frame of a three-dimensional model in a first format produced based on a reality modeling system and the origin of coordinates of the model; reading information of nodes from three-dimensional model data in the first format, and calculating original coordinates of the nodes; wherein the three-dimensional model in the first format is a three-dimensional model in OpenSceneGraph Binary Scene Data (OSGB) format produced based on ContextCapture reality modeling system;

step S2, calculating parameters of correction between the original coordinate frame and a target coordinate frame based on space coordinates of four or more control points in the original coordinate frame in the first format and corresponding space coordinates of the four or more control points in the target coordinate frame in a second format, and constructing a space coordinate correction matrix, wherein the control points are non-coplanar arbitrary points in regions of the three-dimensional model;

step S3, transforming and correcting the coordinates of the origin and nodes of the three-dimensional model in the first format one by one by using the space coordinate correction matrix to obtain information of coordinate points of the three-dimensional model in the second format; and step S4, storing a file of the three-dimensional model in the second format with corrected space coordinates.

2. The method for correcting space coordinates of a three-dimensional model according to claim 1, wherein step S2 further comprises the following steps to calculate the parameters of correction between the original coordinate frame in the first format and the target coordinate frame and construct the space coordinate correction matrix:

step S21, obtaining the space coordinates of the four or more control points in the regions of the three-dimensional model in the original coordinate frame in the first format and the space coordinates of the control points in the target coordinate frame in the second format, and establishing a mathematical model for correction between the original coordinate frame and the target coordinate frame;

step S22, inputting the obtained space coordinates of the control points in the original coordinate frame and in the target coordinate frame into the mathematical model for correction to calculate the parameters of correction; and step S23, constructing the space coordinate correction matrix with the parameters of correction calculated in step S22.

3. The method for correcting space coordinates of a three-dimensional model according to claim 2, wherein the mathematical model for correction established in step S21 is shown below: the mathematical model for correction between the original coordinate frame and the target coordinate frame is established in the form of a seven-parameter model shown in formula (1); a general form of the mathematical model for correction is as shown in formula (2); seven parameters are introduced into the model, including three translation parameters $X_0$, $Y_0$ and $Z_0$ that denote coordinate differences between the origins of coordinates of two space coordinate frames, three rotation parameters $\varepsilon_x$, $\varepsilon_y$ and $\varepsilon_z$ that are used for orderly rotating three coordinate axes such that X-, Y- and Z-axes of two space rectangular coordinate frames coincide, and one scale parameter m that denotes a ratio of lengths of a same straight line segment in two space coordinate frames to allow scale transformation;

$$\begin{bmatrix} X_2 \\ Y_2 \\ Z_2 \end{bmatrix} = (1+m)\begin{bmatrix} X_1 \\ Y_1 \\ Z_1 \end{bmatrix} + \begin{bmatrix} 0 & \varepsilon_Z & -\varepsilon_Y \\ -\varepsilon_Z & 0 & \varepsilon_Z \\ \varepsilon_Y & -\varepsilon_X & 0 \end{bmatrix}\begin{bmatrix} X_1 \\ Y_1 \\ Z_1 \end{bmatrix} + \begin{bmatrix} X_0 \\ Y_0 \\ Z_0 \end{bmatrix} \quad (1)$$

wherein $X_1$, $Y_1$ and $Z_1$ denote the space coordinates in the original coordinate frame in the first format, and $X_2$, $Y_2$ and $Z_2$ denote the space coordinates in the target coordinate frame in the second format; and the general form is as follows:

$$\left.\begin{aligned} X_2 &= X_0 + (1+m)X_1 + \varepsilon_Z Y_1 - \varepsilon_Y Z_1 \\ Y_2 &= Y_0 + (1+m)Y_1 - \varepsilon_Z X_1 + \varepsilon_X Z_1 \\ Z_2 &= Z_0 + (1+m)Z_1 + \varepsilon_Y X_1 - \varepsilon_X Y_1 \end{aligned}\right\} \quad (2)$$

4. The method for correcting space coordinates of a three-dimensional model according to claim 2, wherein orthographic projection or back projection is performed based on corresponding reference frames for the coordinate frame in the first format and the coordinate frame in the second format before and after transformation, respectively.

5. The method for correcting space coordinates of a three-dimensional model according to claim 2, wherein in step S22, the parameters of correction are calculated by using a least square method.

6. The method for correcting space coordinates of a three-dimensional model according to claim 1, wherein step S1 specifically comprises: reading the information of the original coordinate frame of the three-dimensional model in OSGB format and the origin of coordinates of the model; reading information of nodes from three-dimensional model data in the first format, and calculating original coordinates of the nodes; reading data of tiles of the three-dimensional model in OSGB format one by one, obtaining information of PagedLOD nodes in the tiles, and calculating original coordinates of the PagedLOD nodes.

7. The method for correcting space coordinates of a three-dimensional model according to claim 6, wherein in step S1, the original coordinates of each of the PagedLOD nodes in the tiles of the three-dimensional model in OSGB format are calculated according to the following formula:

original coordinates of a PagedLOD
node=coordinates of the origin of the model+
coordinates of a geometric coordinate point.

8. The method for correcting space coordinates of a three-dimensional model according to claim 7, wherein in step S3, the coordinates of the origin of the three-dimensional model and the PagedLOD nodes of the tiles are transformed and corrected one by one by using the space coordinate correction matrix.

9. The method for correcting space coordinates of a three-dimensional model according to claim 8, wherein step S3 specifically comprises the following steps:

step S31, performing space coordinate correction on PagedLOD original coordinates based on the space coordinate correction matrix to obtain corrected PagedLOD space coordinates and corrected space coordinates of the origin of the three-dimensional model; and step S32, after the PagedLOD space coordinate correction is completed, calculating the coordinates of a geometric coordinate point with the corrected PagedLOD space coordinates and the corrected space coordinates of the origin of the three-dimensional model obtained in step S31 according to the following formula:

coordinates of a geometric coordinate point=corrected PagedLOD space coordinates−corrected space coordinates of the origin of the three-dimensional model.

10. A method for encrypting space coordinates of a three-dimensional model, wherein original space coordinates are encrypted by coordinate transformation using the method for correcting space coordinates of a three-dimensional model according to claim 1.

11. The method according to claim 10, wherein step S2 further comprises the following steps to calculate the parameters of correction between the original coordinate frame in the first format and the target coordinate frame and construct the space coordinate correction matrix:

step S21, obtaining the space coordinates of the four or more control points in the regions of the three-dimensional model in the original coordinate frame in the first format and the space coordinates of the control points in the target coordinate frame in the second format, and establishing a mathematical model for correction between the original coordinate frame and the target coordinate frame;

step S22, inputting the obtained space coordinates of the control points in the original coordinate frame and in the target coordinate frame into the mathematical model for correction to calculate the parameters of correction; and step S23, constructing the space coordinate correction matrix with the parameters of correction calculated in step S22.

12. The method according to claim 11, wherein the mathematical model for correction established in step S21 is shown below: the mathematical model for correction between the original coordinate frame and the target coordinate frame is established in the form of a seven-parameter model shown in formula (1); a general form of the mathematical model for correction is as shown in formula (2); seven parameters are introduced into the model, including three translation parameters $X_0$, $Y_0$ and $Z_0$ that denote coordinate differences between the origins of coordinates of two space coordinate frames, three rotation parameters $\varepsilon_x$, $\varepsilon_y$ and $\varepsilon_z$ that are used for orderly rotating three coordinate axes such that X-, Y- and Z-axes of two space rectangular coordinate frames coincide, and one scale parameter m that denotes a ratio of lengths of a same straight line segment in two space coordinate frames to allow scale transformation;

$$\begin{bmatrix} X_2 \\ Y_2 \\ Z_2 \end{bmatrix} = (1+m)\begin{bmatrix} X_1 \\ Y_1 \\ Z_1 \end{bmatrix} + \begin{bmatrix} 0 & \varepsilon_Z & -\varepsilon_Y \\ -\varepsilon_Z & 0 & \varepsilon_X \\ \varepsilon_Y & -\varepsilon_X & 0 \end{bmatrix}\begin{bmatrix} X_1 \\ Y_1 \\ Z_1 \end{bmatrix} + \begin{bmatrix} X_0 \\ Y_0 \\ Z_0 \end{bmatrix} \quad (1)$$

wherein $X_1$, $Y_1$ and $Z_1$ denote the space coordinates in the original coordinate frame in the first format, and $X_2$, $Y_2$ and $Z_2$ denote the space coordinates in the target coordinate frame in the second format; and the general form is as follows:

$$\left.\begin{aligned} X_2 &= X_0 + (1+m)X_1 + \varepsilon_Z Y_1 - \varepsilon_Y Z_1 \\ Y_2 &= Y_0 + (1+m)Y_1 - \varepsilon_Z X_1 + \varepsilon_X Z_1 \\ Z_2 &= Z_0 + (1+m)Z_1 + \varepsilon_Y X_1 - \varepsilon_X Y_1 \end{aligned}\right\}. \quad (2)$$

13. The method according to claim 11, wherein orthographic projection or back projection is performed based on corresponding reference frames for the coordinate frame in the first format and the coordinate frame in the second format before and after transformation, respectively.

14. The method according to claim 11, wherein in step S22, the parameters of correction are calculated by using a least square method.

15. The method according to claim 10, wherein step S1 specifically comprises: reading the information of the original coordinate frame of the three-dimensional model in OSGB format and the origin of coordinates of the model; reading information of nodes from three-dimensional model data in the first format, and calculating original coordinates of the nodes; reading data of tiles of the three-dimensional model in OSGB format one by one, obtaining information of PagedLOD nodes in the tiles, and calculating original coordinates of the PagedLOD nodes.

16. The method according to claim 15, wherein in step S1, the original coordinates of each of the PagedLOD nodes in the tiles of the three-dimensional model in OSGB format are calculated according to the following formula:

original coordinates of a PagedLOD
node=coordinates of the origin of the model+
coordinates of a geometric coordinate point.

17. The method according to claim 16, wherein in step S3, the coordinates of the origin of the three-dimensional model and the PagedLOD nodes of the tiles are transformed and corrected one by one by using the space coordinate correction matrix.

18. The method according to claim 17, wherein step S3 specifically comprises the following steps:

step S31, performing space coordinate correction on PagedLOD original coordinates based on the space coordinate correction matrix to obtain corrected PagedLOD space coordinates and corrected space coordinates of the origin of the three-dimensional model; and step S32, after the PagedLOD space coordinate correction is completed, calculating the coordinates of a geometric coordinate point with the corrected PagedLOD space coordinates and the corrected space coordinates of the origin of the three-dimensional model obtained in step S31 according to the following formula:

coordinates of a geometric coordinate point=corrected PagedLOD space coordinates−corrected space coordinates of the origin of the three-dimensional model.

19. A method for correcting space coordinates of a three-dimensional model, comprising:

step S1, reading information of an original coordinate frame of a three-dimensional model in a first format produced based on a reality modeling system and the origin of coordinates of the model; reading information of nodes from three-dimensional model data in the first format, and calculating original coordinates of the nodes;

step S2, calculating parameters of correction between the original coordinate frame and a target coordinate frame based on space coordinates of four or more control points in the original coordinate frame in the first format and corresponding space coordinates of the four or more control points in the target coordinate frame in a second format, and constructing a space coordinate correction matrix, wherein the control points are non-coplanar arbitrary points in regions of the three-dimensional model;

step S3, transforming and correcting the coordinates of the origin and nodes of the three-dimensional model in the first format one by one by using the space coordinate correction matrix to obtain information of coordinate points of the three-dimensional model in the second format; and step S4, storing a file of the three-dimensional model in the second format with corrected space coordinates;

wherein step S2 further comprises the following steps to calculate the parameters of correction between the original coordinate frame in the first format and the target coordinate frame and construct the space coordinate correction matrix:

step S21, obtaining the space coordinates of the four or more control points in the regions of the three-dimensional model in the original coordinate frame in the first format and the space coordinates of the control points in the target coordinate frame in the second format, and establishing a mathematical model for correction between the original coordinate frame and the target coordinate frame;

step S22, inputting the obtained space coordinates of the control points in the original coordinate frame and in the target coordinate frame into the mathematical model for correction to calculate the parameters of correction; and step S23, constructing the space coordinate correction matrix with the parameters of correction calculated in step S22;

wherein the mathematical model for correction established in step S21 is shown below: the mathematical model for correction between the original coordinate frame and the target coordinate frame is established in the form of a seven-parameter model shown in formula (1); a general form of the mathematical model for correction is as shown in formula (2); seven parameters are introduced into the model, including three translation parameters $X_0$, $Y_0$ and $Z_0$ that denote coordinate differences between the origins of coordinates of two space coordinate frames, three rotation parameters $\varepsilon_x$, $\varepsilon_y$ and $\varepsilon_z$ that are used for orderly rotating three coordinate axes such that X-, Y- and Z-axes of two space rectangular coordinate frames coincide, and one scale parameter m that denotes a ratio of lengths of a same straight line segment in two space coordinate frames to allow scale transformation;

$$\begin{bmatrix} X_2 \\ Y_2 \\ Z_2 \end{bmatrix} = (1+m) \begin{bmatrix} X_1 \\ Y_1 \\ Z_1 \end{bmatrix} + \begin{bmatrix} 0 & \varepsilon_Z & -\varepsilon_Y \\ -\varepsilon_Z & 0 & \varepsilon_X \\ \varepsilon_Y & -\varepsilon_X & 0 \end{bmatrix} \begin{bmatrix} X_1 \\ Y_1 \\ Z_1 \end{bmatrix} + \begin{bmatrix} X_0 \\ Y_0 \\ Z_0 \end{bmatrix} \qquad (1)$$

wherein $X_1$, $Y_1$ and $Z_1$ denote the space coordinates in the original coordinate frame in the first format, and $X_2$, $Y_2$ and $Z_2$ denote the space coordinates in the target coordinate frame in the second format; and the general form is as follows:

$$\left. \begin{array}{l} X_2 = X_0 + (1+m)X_1 + \varepsilon_Z Y_1 - \varepsilon_Y Z_1 \\ Y_2 = Y_0 + (1+m)Y_1 - \varepsilon_Z X_1 + \varepsilon_X Z_1 \\ Z_2 = Z_0 + (1+m)Z_1 + \varepsilon_Y X_1 - \varepsilon_X Y_1 \end{array} \right\}. \qquad (2)$$

* * * * *